INVENTOR
PAUL B. BOSWELL

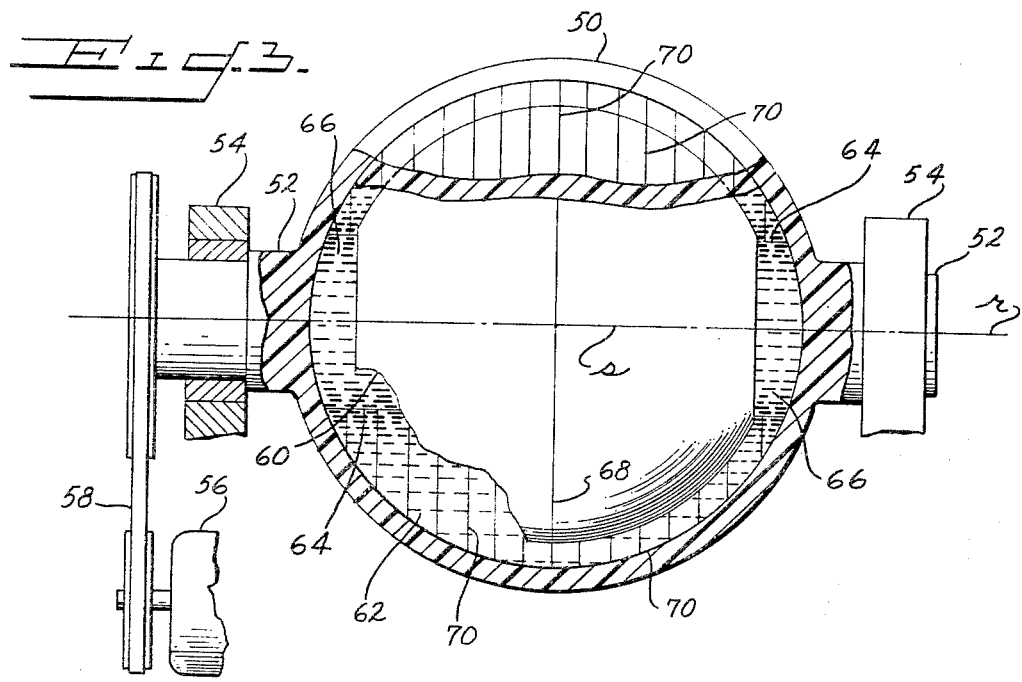
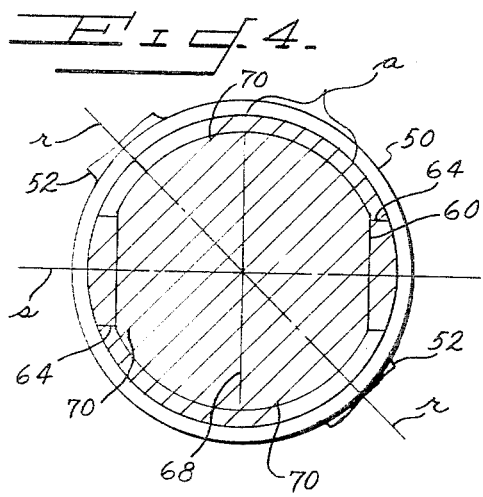
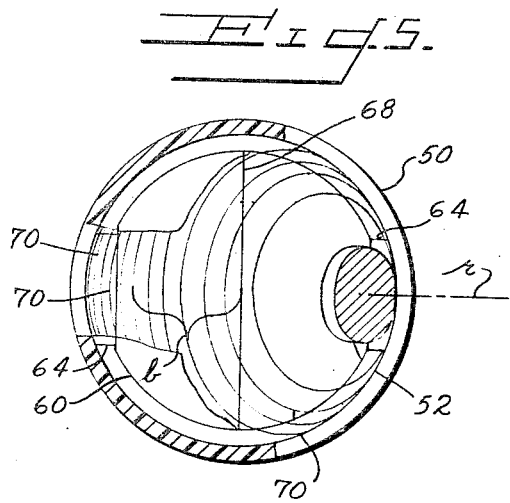

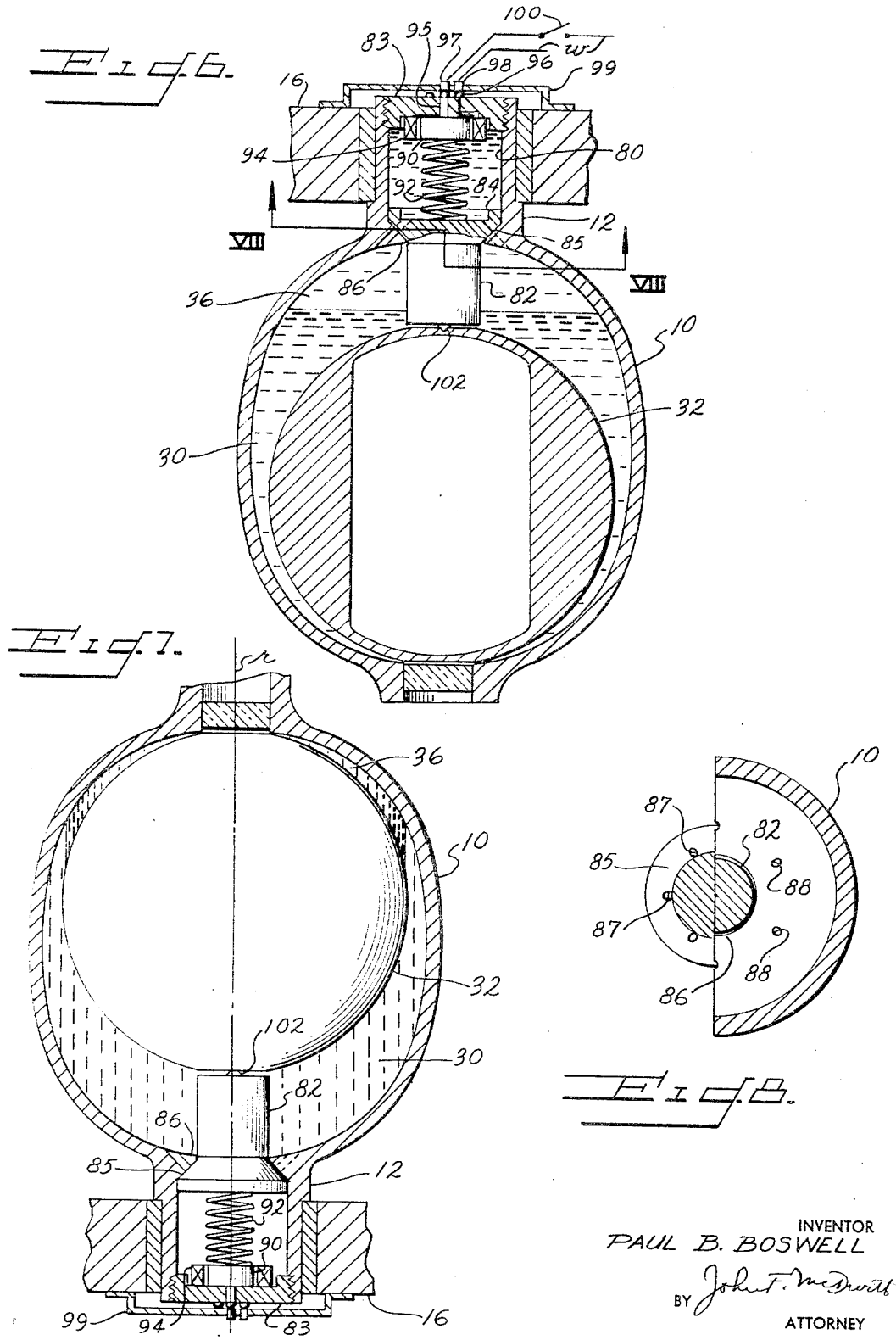

United States Patent Office 3,401,567
Patented Sept. 17, 1968

1

3,401,567
GYROSCOPES
Paul B. Boswell, Pittsfield, Mass., assignor to General
Electric Company, a corporation of New York
Filed Oct. 12, 1964, Ser. No. 403,085
7 Claims. (Cl. 74—5)

The present invention relates to improvements in gyroscopes.

One object of the invention is to provide a new form of gyroscope to meet the needs of present day navigation and guidance systems.

Another object of the invention is to simplify and reduce the cost of gyroscopes while maintaining a high level of accuracy.

A further object of the invention is to provide improved inherent stability, particularly for displacement type gyroscopes, to thereby minimize errors from external vibration or shock.

Yet another object of the invention is to increase the accuracy of gyroscopes by minimizing, if not eliminating, inaccuracies resulting from friction forces which are a primary cause of random drift.

Yet another object of the invention is to minimize, if not eliminate, errors resulting from imperfections in journals employed in gyroscopes, this being another cause of random drift which is a limiting factor of accuracy for any gyroscope or system in which the gyroscope is employed.

In the broader aspects of the invention, these ends are attained by a gyroscope comprising a rotating casing and a gyroscopic element therein. Fluid within said casing is rotated as a body as a result of rotation of said casing. The gyroscopic element is suspended in the fluid so that the rotating body of fluid spaces the element from the inner surface of the casing in a radial sense and provides means for rotating the gyroscopic element about an axis coincident with the axis of rotation of the casing.

Preferably, the suspending fluid is a liquid which partially fills the interior of the casing in sufficient quantity to float the gyroscopic element. The axial ends of the gyroscopic element are spaced from the casing and the rotating body of liquid defines aligned columns on opposite sides of the gyroscopic element which are concentric with the axis of rotation and which provide means for spacing the gyroscopic element in an axial direction. In accordance with said principles of operation, the weight of the gyroscopic element is less than the displaced volume of suspending fluid occupied by the element to provide the necessary buoyancy. The amount of radial stiffness imputed to the gyroscopic element during operation by the suspending fluid is a function of the fluid density. Greater radial stiffness is desirably obtained by using a suspending fluid of greater density than said gyroscopic element.

Advantageously, these columns are relatively rigid to positively position the gyroscopic element in an axial sense and comprise either a second liquid which is less dense than and immiscible with the first liquid, or a compressed gas. Said second fluid is conveniently identified hereinafter in the specification as the "lighter" liquid or gas.

The gyroscopic element is advantageously formed as a sphere, particularly where a displacement gyroscope of high accuracy is desired. In such a gyroscope, the gyroscopic element may be formed as a hallow sphere having a concentration of mass at its equator to obtain the largest possible angular momentum. Said momentum can further be desirably increased by using a material of construction for the gyroscopic element having greater density than the suspending fluid.

The structure above described may be employed as a rate gyroscope wherein the rate of precession of the gyroscopic element indicates the rate of angular acceleration. Advantageously transparent materials may be used for the casing and rotating body of liquid to enable an indicium on the gyroscopic element to be matched against reference indicia for visual determination of the rate of angular acceleration.

In accordance with other objects of the invention, novel means and method aspects are herein disclosed for spacing the gyroscopic element inwardly from the ends of the rotating casing and providing the two inner fluid columns referred to above. More specifically, a chamber is provided into which a portion of the lighter liquid or gas may be drawn when the casing is disposed with the chamber at its upper end. The casing is then inverted and rotated as the piston is retracted into the chamber to provide a second column of the lighter fluid at the opposite end of the gyroscopic element.

Other related objects and features of the invention will be apparent from a reading of the following description of the disclosure found in the accompanying drawings and the novelty thereof pointed out in the appended claims.

In the drawings:

FIGURE 3 is an elevation, partly in longitudinal section, of an alternate embodiment of the invention;

FIGURES 4 and 5 are views on a reduced scale illustrating different positions of the gyroscope seen in FIGURE 3;

FIGURES 6 and 7 are elevations, partly in longitudinal section, of a modified embodiment of the invention and illustrate method steps taught herein; and FIGURE 8 is a section taken on line VIII—VIII in FIGURE 6.

Figure 1:
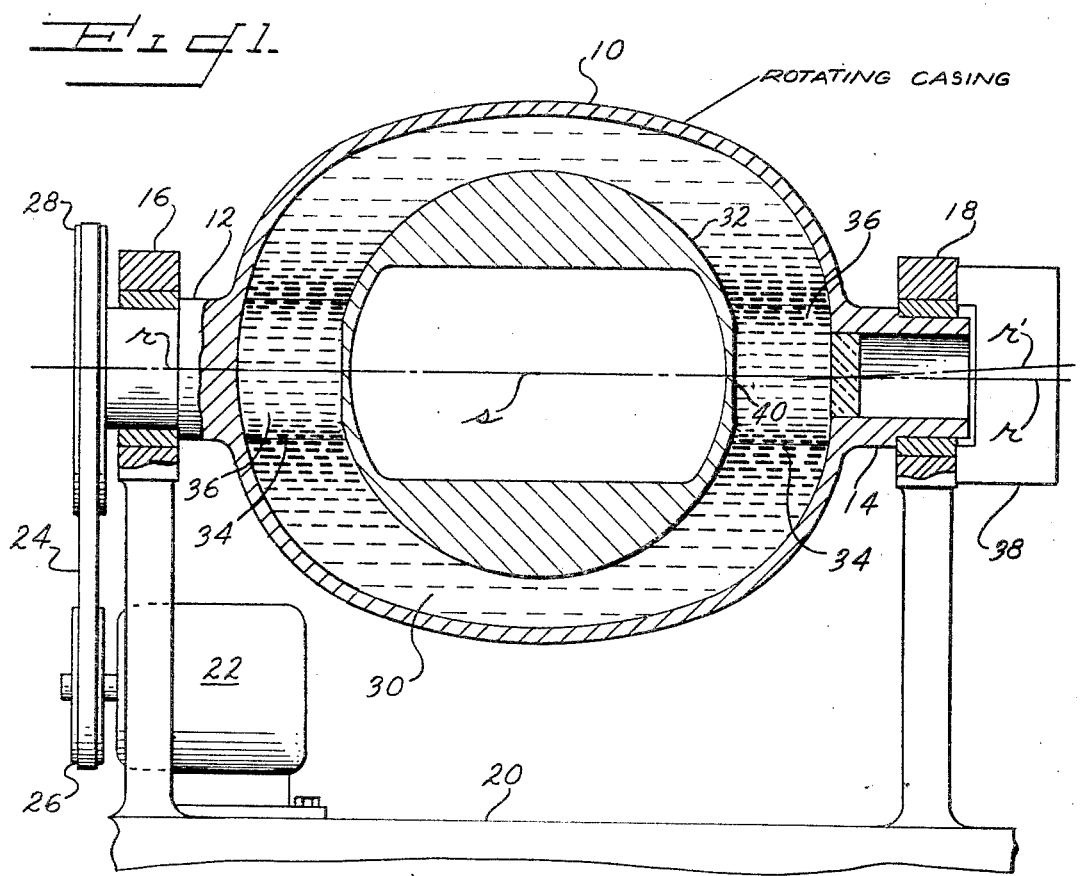
FIGURE 1 is an elevation, partly in longitudinal section, of a gyroscope embodying the present invention.
Figure 2:
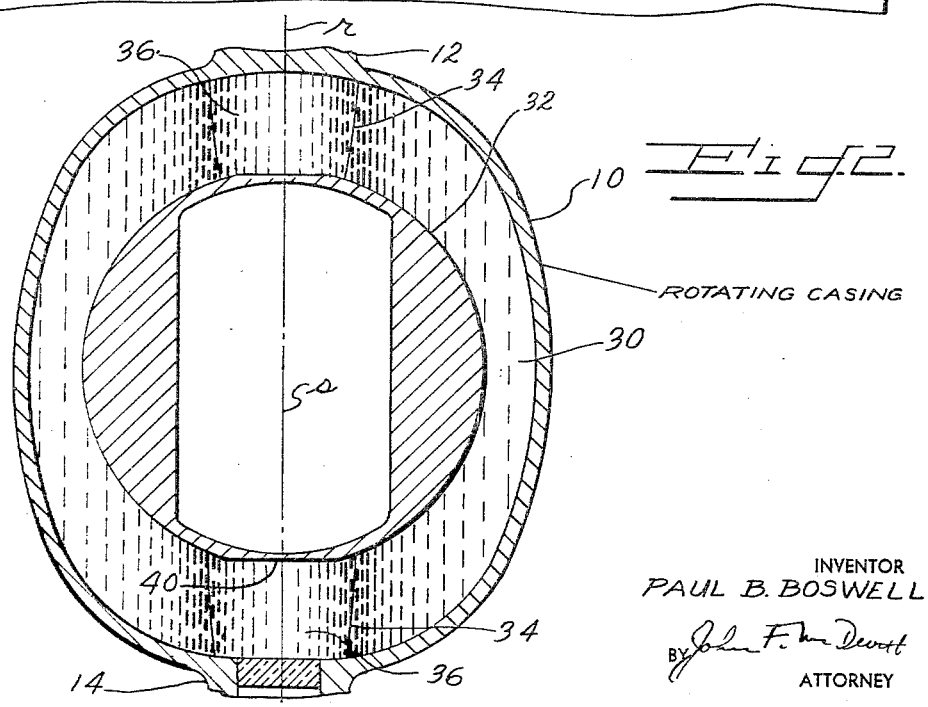
FIGURE 2 is a fragmentary elevation of this gyroscope rotating about a vertical axis.

The gyroscope shown in FIGURES 1 and 2 comprises an outer casing 10 having aligned trunnions 12, 14 at its opposite ends which are rotatably received by relatively fixed journals 16, 18 on a platform or table 20. Any suitable means may be employed for rotating the casing 10 and for illustrative purposes a motor 22 is shown drivingly connected to the trunnion 12 by a belt 24 and pulleys 26, 28 secured to the motor and trunnion respectively. In FIGURES 1 and 2 the motor 22 is in operation and the casing 10 is rotating about an axis $r$ at a relatively high rate which, for a gyroscope, is normally in the order of 10,000 r.p.m. or greater.

The casing 10 is partially filled with what will be designated as a first liquid 30 which, due to the rotation of the casing 10, rotates as a body conforming to the contour of the longitudinal inner surface of the casing 10. Also disposed within the casing 10 is a gyroscopic element 32 having a weight less than that of the liquid 30 being displaced by said element. Since the gyroscopic element 32 is suspended in liquid 30 by the buoyant force, it is centralized by the rotating body of liquid on the axis of rotation of the casing and is thus spaced in a radial sense or direction from the inner surface of the casing 10. Friction attributable to the viscosity of the liquid 30 provides means for rotating the gyroscopic element 32 about a spin axis $s$ which is coincident with the casing axis $r$. The rate of rotation of the gyroscopic element 32 and also that of the body of liquid 30 are essentially the same as the rate of rotation of the casing 10.

As can be seen from FIGURE 1, the gyroscopic element 32 is spaced from the opposite axial ends of the casing 10. It will also be seen that the liquid 30 only partially fills the interior space of the casing 10 which is not occupied by the gyroscopic element 32. The rotating body of liquid 30, because of centrifugal force, defines at opposite axial ends of the element 32, aligned columns 34 which are concentric with the axes $r$ and $s$. The columns 34 defined by the rotating body of liquid 30 provide means for axially positioning the element 32. The columns 34 usually are filled with a fluid 36 which will herein be referred to as a second fluid. This second fluid may be either a gas or a liquid having the physical properties hereinbefore designated.

In order that the gyroscopic element be positively positioned in an axial sense relative to the casing 10, it is preferable that the columns 34 be rigid or at least substantially so. For this reason it is advantageous that the fluid 36 be a liquid and in this context all pure liquids are considered to be essentially incompressible. However, the selection of a suitable liquid having the desired property of incompressibility is a simple matter since published figures giving the compressibility or incompressibility of most liquids are readily available. It is also to be noted that the fluid 36 may be a compressed gas at sufficient pressures to positively position the gyroscopic element 32 in an axial sense.

It will be appreciated that the volume of liquid 30 is sufficient to provide for uninterrupted contact with the gyroscopic element 32 along a peripheral sector thereof. The diameter of the columns 34 may vary from an amount sufficient for such contact, down to a diameter constant with maintaining buoyancy of the element 32 and the desired axial stiffness of element 32's support.

The diameters of the columns 34 are preferably equal so that contact of the liquid 30 with the element 32 will be symmetrical on opposite sides of a median, perpendicular to the axis $s$. This relationship may be attained where the fluid 36 is a liquid by having equal volumes of the liquid on opposite sides of the element 32. Where the fluid 36 is a gas, equal diameters may be provided for by having equal pressures and volumes in the two columns when the spin axis $r$ is horizontal.

This brings up a further point that the diameters of the columns 34 are a function of their volumes. The shapes, however, of these columns are essentially unaffected by pressure or by whatever fluid 36 is employed. Thus, FIGURE 2 illustrates the present gyroscope rotated 90° with the axes $r$ and $s$ disposed vertically. The columns 34 assume a slightly parabolic shape due to the influence of gravity Assuming a rate of rotation in the order of 10,000 r.p.m.'s, the parabolic shape illustrated in FIGURE 2 is greatly exaggerated and represents the approximate shape these columns would assume under a force of 150 times gravity. Such a condition might be encountered in an acceleration of the gyroscope in an axial direction. However, this tendency to assume a parabolic shape due to gravity or acceleration is essentially unaffected by the nature of the fluid 36 provided the densities of gyroscope element 32 and suspending fluid 30 are not greatly different.

Considering next the gyroscopic element 32, it is a salient feature of the present invention that its weight is less than the displaced volume of suspending fluid, viz. liquid 30, which positions it in a radial sense from the interior casing 10 and provides the means for rotating it about the spin axis $s$. The necessary buoyancy of the element can be provided with a solid body fabricated from a material of lesser density than the suspending fluid. Alternately, a hollow element can be made of relatively dense materials, such as lead, to operate satisfactorily in non-reactive fluids of lesser density, such as organic liquids, water, and the like. Beyond this, it is desirable in accordance with known gyroscopic principles, that the element 32 has a maximum angular momentum. This in turn makes preferable the selection of a relatively dense liquid of low viscosity thereby enabling the gyroscopic element 32 to be formed of a high density material. Thus, it is within present contemplation for greater angular momentum to use such dense materials as tungsten for the gyroscopic element in association with mercury for the suspending fluid. Since tungsten has a higher density than mercury the contemplated embodiment would employ a gyroscopic element in the form of a hollow sphere with an equatorial cord defining a uniform concentration of the tungsten material at the greatest possible radius from the axis of rotation. The low viscosity characteristic of the liquid minimizes erroneous erection torques (torques that tend to align $s$ with $r$ in FIGURE 1) in displacement gyro applications. Said low viscosity fluid yields a larger displacement angle and signal for a given rate which is desirable in rate gyro applications. The lighter fluid 36 should, of course, be immiscible and nonreactive with respect to the other elements of the gyroscope which it contacts. A suitable fluid 36 for the contemplated embodiment with these properties can be selected from the class of common liquids having a density of less than fluid 30 including water, low-vapor pressure organic liquids, and the like.

The shape of the case member for a gyroscope of the invention has not been found critical. A spherical member or any other shape of regular cross section that does not introduce turbulence into the rotating mass of fluid is acceptable. For minimum turbulence, it is also desirable to provide the case member with a smooth interior contour free of obstructions, protuberances, and the like which could disturb the fluid flow pattern. Flow disturbance should be avoided in the spherical or oblate case members herein exemplified.

Selection of an extremely heavy or dense liquid 30 and a correspondingly heavy gyroscopic element 32 is of particular advantage in a displacement type gyroscope. However, other materials may advantageously be employed, not only for displacement type gyroscopes, but for rate type gyroscopes, as will be later discussed in greater detail. It follows from the foregoing considerations that a large number of specific gyroscope embodiments can be built each utilizing the same principles of the invention. For example, the specific embodiment may have a gyroscopic element fabricated from a material which is either less dense or more dense than the suspending fluid, said element being suspended in a case member containing one or more liquids. Those skilled in the gyroscope art are enabled from the above teachings and the further detailed description which follows to select the most useful combination of individual elements for the particular application.

When gyroscopic element 32 is rotating as above described, it resists all forces which attempt to angularly displace its spin axis $s$, in accordance with accepted gyroscopic laws applicable to rotating bodies. The rotating body of liquid 30 also has this property as does the rotating casing 10. Assuming that the table 20 is part of some known gyroscopic system as might be employed on a ship, airplane, missile or the like, any change in the angular attitude of such vehicle will result in a displacement in the angular attitude of the table 20. Unless this change is solely about axis $r$ it will create a displacement of the casing axis $r$ to a position represented by the axis $r'$, thus creating an angular displacement between the axis $r$ and the spin axis $s$ of the gyroscopic element.

It is conventional to employ "pick-offs" for detecting angular displacement of a mounting table relative to a gyroscopic element. In conventional gyroscopes such pick-offs employ inductance, capacitance and optical sensing means. In the present instance, an optical pick-off is preferred because of the high accuracy obtainable and because no measurable force is exerted in the gyroscopic element which would cause precession and random drift.

In FIGURE 1, an optical pick-off 38 is shown mounted on the journal 18 and more specifically is an auto auto collimator of known construction. Briefly describing the operation of the auto auto collimator, it comprises means for directing a collimated beam of light along the axis $r$ and against a reflecting facet 40 disposed in a transverse plane on the adjacent end of the element 32. In this connection it will be noted that the trunnion 14 is hollow, the end wall of the casing 10 at the base of the trunnion 14 is transparent and the fluid 36 is also transparent, all to provide for the transmission of the light beam of the auto auto collimator. This light beam is reflected from the facet 40, back to sensing means of the auto auto collimator. The auto auto collimator itself is incorporated in a null balance servo system controlling means for changing the angular attitude of the table 20. Such systems again being known to those in the art. So long as the axes $r$ and $s$ are coincident, the beam of light reflected by the facet 40 follows the same path as the incident beam. Whenever there is an angular deviation between the axes $r$ and $s$, the reflected beam of light is angularly displaced from the incident beam and such deviation is detected by photosensitive means of the auto auto collimator which determines deviations along conventional $x$ and $y$ coordinates, both plus and minus. The detection of such deviations actuates the servo system to reposition the platform 20 bringing the axis $r$ back into alignment with the spin axis $s$ of the gyroscopic element. From this it will be apparent that the present gyroscope may function as a two degree of freedom gyroscope.

The auto auto collimator and other optical pick-off systems are capable of sensing angular deviations of 1 arc second or less. With this in mind and recognizing the fact that as the casing 10 shifts relative to the rotating body of fluid 30, there is a time lag before the inner portions of said body of liquid would shift the columns 34 into concentric relation with the newly assumed attitude of the axis $r$ (as it is displaced to its position $r'$). The friction forces of the liquid 30 relative to the element 32 remain unchanged, or at least essentially so. Thus, it is possible to bring the axis $r$ back into alignment with the spin axis $s$ before any forces have tended to change the spatial attitude of the spin axis $s$ which is a critical factor affecting the inherent accuracy of the gyroscope itself.

The accuracy of the gyroscope is also improved by the gyroscopic stabilizing effect of the rotating mass of fluid body 30.

The described embodiment illustrates the essential features for obtaining a highly accurate two degree of freedom gyroscope sufficient for those skilled in the art. It will, of course, be apparent that many different structural arrangements may be employed within the scope of this teaching, as for example more sophisticated journals for the casing trunnions or vibration minimizing means for the drive employed in rotating the casing as well as various other equivalents or modifications.

FIGURE 3 illustrates an embodiment of the present invention which is particularly adapted for use as a rate gyroscope, that is, a gyroscope employed to measure the rate of angular displacement of a vehicle or the like. The gyroscope illustrated in FIGURE 3 comprises the same fundamental components as in the previously described embodiment. Thus, a casing 50 is rotatably mounted by trunnions 52 at its opposite ends on journals 54. Again, a motor 56 is provided for rotating the casing 50 about an axis $r$ through the illustrated drive comprising a belt 58.

A gyroscopic element 60 is disposed within the rotating casing 50 which is partially filled with a liquid 62. The weight of the gyroscopic element 60 is less than the liquid 62 being displaced by said element. Rotation of the casing 50 causes the liquid 62 to rotate as a body spacing the gyroscopic element 60 in a radial sense from the inner surface of the casing and causing it to rotate about a spin axis $s$ which is coincident with the axis $r$. The rotating body of liquid 62 defines columns 64 at opposite axial ends of the gyroscopic element 60 which space the gyroscopic element from the casing 50 in an axial sense. The columns 64 are preferably formed of a second lighter liquid 66 to positively position the gyroscopic element 60 axially of the casing 50 as previously described.

For illustrative purposes, let it be assumed that the gyroscope of FIGURE 3 is mounted in an airplane with the axis $r$ disposed horizontally and transverse to the longitudinal axis of the plane on what would be referred to as the pitch axis. If the plane rolls about its longitudinal axis, the axis $r$ will rotate in a vertical plane relative to the spin axis $s$. If the plane makes an azimuth turn, the axis $r$ will rotate in a horizontal plane relative to the spin axis $s$. Angular rates of change about two axes are thus indicated, again illustrating that this is a two degree of freedom gyroscope.

After the axis $r$ has rotated a relatively short angular distance, an erection torque is exerted on the gyroscopic element 60 tending to realign the axis $s$ with the axis $r$. The amount of axial displacement between the axis $s$ and $r$ is proportional to the angular rate of turn and may be calibrated to indicate the magnitude of this rate of turn. The amount of axial displacement between the axes $s$ and may be detected by pick-off means employing various types of sensing devices, as previously referred to. However, the present embodiment is primarily intended to give a visual indication of the rate of turn.

To this end the casing 50 is formed of a transparent material and the liquid 62 is also selected as a transparent material. The gyroscopic element 60 is formed in any appropriate manner, as previously taught, with a density less than the density of the liquid 62. A line of indicia 68 or equivalent is circumscribed about the equator of the globular element 60. The line 68 is thus visible as the gyroscopic element rotates within the casing 50. A series of indicia lines 70 may be circumscribed interiorly (in order to minimize a parallax) of the casing 50 as references against which the indicia line 68 may be gauged to ascertain the rate of angular turn.

When the airplane rolls, that is, turns about its longitudinal axis, the axis $r$ is rotated relative to the element 60 which tends to remain rotating about a horizontal axis. FIGURE 4 illustrates the relative positions of the casing 50 and element 60 during a roll. The displacement $a$ indicates the rate of roll and the lines 70 may be calibrated to indicate magnitude.

FIGURE 5 similarly illustrates an azimuth turn where the casing 50 is rotated in a horizontal plane relative to element 60. Distance $b$ indicates the rate of turn and the lines 70 may again be calibrated to quantitatively indicate magnitude.

It will also be appreciated that the present structure could be modified to be viewed on its axis for the same function as a rate gyroscope. If this were done, an indicia on the axial end face of the gyroscopic element could be matched against $x$ and $y$ coordinates to ascertain rate and direction of angular rate of turn.

While the gyroscopic element may be initially spaced from the axial surfaces of the rotating casing in various ways, the means and method now to be described are advantageous. These means are shown in FIGURES 6–8 which illustrate a modification of the embodiment of FIGURE 1 wherein a chamber 80 is formed in the trunnion 12. A plunger or piston 82 is slidable within this chamber which is closed at its outer end (by a plug 83 threaded into trunnion 12) and opens into the interior of the casing 10. An outwardly flared skirt 84 is formed on the plunger 82, providing a shoulder 85 which sealingly engages an inturned peripheral lip 86 defining the opening of chamber 80 into the casing 10. A series of passageways 87 (see FIGURE 8) extend through the skirt 84 and open on the shoulder 86. A second series of passageways 88 extend through the lip 86 and are angularly offset from the passageways 87.

Means are provided for reciprocating the plunger 82 into and out of the chamber 80. These means may take the form of a permanent magnet 90 secured to the plug 83, a compression spring 92 urging the plunger 82 outwardly of the chamber 80 and polarity reversing means comprising a coil 94 surrounding the magnet 90. The coil 94 is connected by wires to a central contact 95 and a circular contact 96 which are engaged by stationary contacts 97, 98 mounted on a bracket 99 secured to the journal 16. Wires w connect the coil 94 to an appropriate circuit for reversing its polarity so that it nullifies, in effect, the magnetic force of magnet 90. When the polarity reversing means nullify the force of magnet 90, spring 92 is effective to displace plunger 82 outwardly of chamber 80 toward the interior of casing 10. When conventional polarity reversing means are applied, magnet 90 overcomes the force of spring 92 and retracts the plunger 82 within the chamber 80. In the described embodiment, loss of electrical excitation does not expel plunger 82 from the chamber since the permanent magnetic force in the operating polarity exceeds the spring force.

In operation, the casing 10 including the chamber 80, are completely filled initially with predetermined proportions of the liquids 30 and 36. The gyroscope is then placed with the axis r vertically disposed and with the chamber 80 at the upper end of the casing 10. It will also be noted that the plunger 82 preferably is in a projected position at this point and has a tit 102 which is received by a recess in the axial end of element 32 opposite the facet 40. When the gyroscope is shut down the plunger 82 is normally in this projected position so that the facet 40 will face the optical pick-off 38 when the casing 10 is again rotated. After being brought to a vertical position, the piston 82 is preferably reciprocated sufficiently so that all of the suspending liquid 30 will be discharged (if present) from the chamber 80 and settle to the bottom of the casing 10 and all of the lighter fluid 36 will rise to the top so that only the fluid 36 will be within the chamber 80. The piston 82 is then fully displaced from the chamber 80 by spring 92, as the polarity reversing coil 94 is actuated through switch 100 thereby trapping a portion of the fluid 36 therein, as seen in FIGURE 7. When the piston 82 is fully displaced, a shoulder 85 is in sealing relation with the lip 90 preventing further flow of the fluid 36 into or out of the chamber 80 through passageways 87, 88. The shoulder 85 may not physically engage the lip 86 but will be sufficiently close thereto to prevent flow of fluid between chamber 80 and casing 10, as the latter is inverted to the position of FIGURE 7. The motor 22 is actuated to rotate the casing 10 about an axis r when the gyroscope has been thus inverted or at a point where the fluid 36 will be trapped in a column between the pick-off end of casing 10 and the end of the sphere on which facet 40 is formed. Centrifugal force resulting from rotation of the casing causes the formation of such a column at the upper end of the casing trapping the fluid 36, as shown in FIGURE 7. With one portion of fluid thus entrapped at one end of the casing 10, the piston 82 is then retracted by the magnet 90 when coil 94 is deenergized. The fluid 36 is discharged from the chamber 80 and entrapped at the opposite end of the element 32 as the liquid 30 defines a second column 34 of the fluid 36 between the casing and the adjacent axial end of the element 32 in the fashion illustrated in FIGURE 1.

By properly dimensioning the chamber 80 and piston 82, it is possible to readily obtain equal volumes of the fluid 36 at opposite ends of the element 32 so as to obtain the desired equal diameters for the columns 34.

Again it will be pointed out that various modifications of the described embodiments within the spirit of the invention will be apparent to those skilled in the art and the scope thereof is to be derived solely from the following claims.

What is claimed as new and desired to be secured by Letters Patent of the United States is:

1. A gyroscope comprising a rotatable casing, a gyroscopic element disposed therein, said casing being partially filled with a suspending liquid for the gyroscopic element, means for disposing a second fluid having a density less than that of the suspending liquid at one axial end of the casing, means for rotating the casing to entrap the second fluid in a column at said one axial end, and means for discharging a second portion of said second fluid into the opposite axial end of said casing to form a second column of the second fluid thereby positioning the gyroscopic element in an axial sense relative to the casing.

2. A gyroscope comprising a rotatable casing, a gyroscopic element disposed therein, said casing being filled with a suspending liquid for the gyroscopic element, and a second fluid having a density less than that of said suspending liquid and immiscible therewith, a chamber at one axial end of said casing, a piston disposed within said chamber, passageway means for the flow of the second fluid between said casing and said chamber, means for reciprocating said piston in said chamber associated with means for sealing said passageway means when the piston is moved outwardly of said chamber toward the interior of said casing to thereby entrap a quantity of second fluid in said chamber when the chamber is at the upper end of said casing, and means for rotating the casing to form a column of second fluid at both ends of the gyroscopic element as the piston is moved inwardly of said chamber to discharge second fluid therefrom thereby positioning the gyroscopic element in an axial sense.

3. A gyroscope as in claim 2 wherein the piston and gyroscopic element have cooperating detent means orienting the element relative to the casing.

4. The method of axially spacing a gyroscopic element within a rotatable casing having a chamber at one axial end thereof, and filled with a suspending liquid for the gyroscopic element, and a second fluid having a density less than that of the suspending liquid and immiscible therewith, said method comprising the steps of disposing the casing with the chamber at the upper end thereof, drawing into said chamber and retaining therein a portion of said second fluid, inverting and rotating said casing so that the suspending liquid rotates as a body trapping a portion of the second fluid between the gyroscopic element and the other axial end of the casing and discharging the second fluid from said chamber to provide columns of the second fluid on the opposite sides of the gyroscopic element to position it in an axial sense.

5. A method of axially spacing a gyroscopic element within a rotatable casing partially filled with a suspending liquid for the gyroscopic element, said method comprising the steps of providing a quantity of a second fluid having a density less than that of said suspending liquid at one axial end of said casing, rotating said casing to entrap said second fluid in a column between the element and the casing, and injecting into the opposite axial end of the rotating casing a second portion of the second fluid to provide a second column thereof between the casing and the element and thereby space the element in an axial sense relative to the casing.

6. A method as in claim 5 wherein a second liquid immiscible with the first liquid is provided as the second fluid for said columns and the quantities of second liquid provided at opposite ends of the casing are equal.

7. A gyroscope comprising a rotating casing, a gyroscopic element disposed therein, a suspending liquid partially filling the interior space of said casing, rotation of said casing causing said liquid to rotate as a body conforming to its inner longitudinal surface, said element having a weight less than the displaced volume of liquid occupied by the element, said rotating body of liquid spacing said element from the inner surface of said casing in a radial sense, and the amount of said liquid being sufficient to cover a peripheral sector of said element and define aligned columns concentric with said axes, said columns consisting of a second liquid, having a density less than that of the suspending liquid, and essentially immiscible therewith to provide rigid means for positioning said element in an axial sense, drive means for rotating the element about a spin axis concident with the axis of rotation of the casing, and means to obtain approximately equal volumes of said second liquid opposite axial ends of the gyroscopic element.

References Cited

UNITED STATES PATENTS

| | | | |
|---|---|---|---|
| 1,890,831 | 12/1932 | Smyth | 74—5 |
| 2,871,706 | 2/1959 | Fischer et al. | 74—5.7 |
| 3,226,984 | 1/1966 | Humphrey | 74—5.7 X |

CORNELIUS J. HUSAR, *Primary Examiner.*